(12) United States Patent
Korus et al.

(10) Patent No.: US 8,777,133 B2
(45) Date of Patent: Jul. 15, 2014

(54) IRRIGATION SYSTEM FOR SMALL FIELDS

(75) Inventors: Tom Korus, Lindsay, NE (US); Luke Pare, Elkhart, IN (US); Jochen Pfrenger, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 627 days.

(21) Appl. No.: 12/873,713

(22) Filed: Sep. 1, 2010

(65) Prior Publication Data

US 2011/0127344 A1    Jun. 2, 2011

Related U.S. Application Data

(60) Provisional application No. 61/265,413, filed on Dec. 1, 2009.

(51) Int. Cl.
*B05B 3/00*        (2006.01)
(52) U.S. Cl.
USPC .......................................... 239/726; 239/729
(58) Field of Classification Search
CPC ..... A01G 25/00; A01G 25/09; A01G 25/097; A01G 25/095
USPC ......... 239/722, 723, 726, 730, 736, 739, 745, 239/159, 1, 728, 729
See application file for complete search history.

(56) References Cited

U.S. PATENT DOCUMENTS

| | | | | |
|---|---|---|---|---|
| 2,931,579 A | * | 4/1960 | Ruddell | 239/736 |
| 3,583,428 A | * | 6/1971 | Cornelius | 239/736 |
| 4,184,639 A | * | 1/1980 | Miller | 239/733 |
| 4,673,130 A | * | 6/1987 | Simpson | 239/167 |
| 4,946,102 A | * | 8/1990 | DeWitt et al. | 239/167 |
| 5,310,115 A | * | 5/1994 | Broyhill | 239/168 |
| 5,348,226 A | * | 9/1994 | Heiniger et al. | 239/1 |
| 5,630,547 A | * | 5/1997 | Klemenhagen et al. | 239/161 |

* cited by examiner

*Primary Examiner* — Davis Hwu
(74) *Attorney, Agent, or Firm* — Hovey Williams LLP

(57) ABSTRACT

An irrigation system and method for irrigating a field including a plurality of towers linked together by at least one rotatable torque tube. Each of the towers may comprise a frame, one or more wheels on which the frame may travel, a rotatable reel, and a line configured to be spooled onto the reel. A motor may be configured to rotate the torque tube, which may in turn actuate each of the reels to rotate simultaneously. One end of each of the lines may be anchored at a first location and the towers may be located at a second location. Rotation of the reels spools the lines onto the reels and thereby actuates the towers to travel from the second location to the first location. The irrigation system also comprises hoses to link one or more fluid-emitting devices positioned on each of the towers with a water source.

22 Claims, 8 Drawing Sheets

IRRIGATION SYSTEM FOR SMALL FIELDS

RELATED APPLICATIONS

This non-provisional patent application claims priority benefit with regard to all common subject matter of the earlier filed U.S. Provisional Patent Application titled "Irrigation System for Small Fields", Ser. No. 61/265,413, filed on Dec. 1, 2009, which is hereby incorporated by reference in its entirety into the present application.

BACKGROUND

1. Field

Embodiments of the present invention relate to a system and method for irrigating an agricultural field.

2. Related Art

Irrigating agricultural fields can require heavy, bulky equipment which can be difficult to transport from one location to another. The size and fixed configuration of current irrigation systems does not efficiently accommodate a variety of field sizes. Furthermore, heavy, expensive equipment is impractical for small fields.

Accordingly, there is a need for an irrigation system that overcomes the limitations of the prior art.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Embodiments of the present invention solve the above-mentioned problems and provide a distinct advance in the art of irrigation systems. Various embodiments of the invention include an irrigation system comprising two end towers and a middle tower located between the end towers, with at least one torque tube linking the towers with each other. The torque tube may also rotate relative to a frame of each of the towers. Each tower may further comprise one or more wheels for its frame to travel on, a reel rotatably attached to the frame, and a line having a first end attached to the reel and a second end configured to be anchored at a first location in the field, with the towers located at a second location in the field. The line is configured to be spooled onto the reel when the reel rotates.

The irrigation system may also comprise a gear motor powered by a battery and attached to the middle tower. The gear motor may actuate the torque tube. The irrigation system may also comprise a guide rail anchored to and extending across the field. The wheels of the middle tower may be located on and configured to travel along the guide rail.

At least one clutch may be attached to the reels and/or the torque tube to engage and disengage the reels and the torque tube with each other. In an engaged position, the clutch rotatably links the reels and the torque tube such that the torque tube actuates simultaneous rotation of each of the reels. In a disengaged position, the clutch releases the reels and/or the torque tube such that the reels and the torque tube are independently rotatable. At least one fluid emitting device may be fixed to one or more of the towers, with linking hoses attached to and fluidly connecting the fluid-emitting devices with each other and with a source of fluid, such as water.

A method of irrigating a field using the irrigation system may comprise anchoring an end of at least one of the lines at a first location in the field, positioning the plurality of towers at a second location in the field, and actuating the torque tube via the gear motor, causing the reels to rotate and spool the line thereon. By taking up the line, the towers are subsequently pulled toward the first location. The method may also comprise engaging the clutch prior to starting the motor so that the reel rotates when the torque tube rotates. Furthermore, a supply/shut-off valve of the irrigation system may be opened, allowing fluid to flow from a fluid supply to a fluid-emitting device of the irrigation system.

The method of irrigating the field may also comprise actuating a stop switch when the towers have reached a predetermined location relative to the first location in order to close the supply/shut-off valve and/or stop rotation of the reels. The clutch may then be disengaged such that the reels rotate independently of the torque tube and the towers may be pushed or pulled back toward the second location.

BRIEF DESCRIPTION OF THE DRAWING FIGURES

Embodiments of the present invention are described in detail below with reference to the attached drawing figures, wherein.

Figure 1:
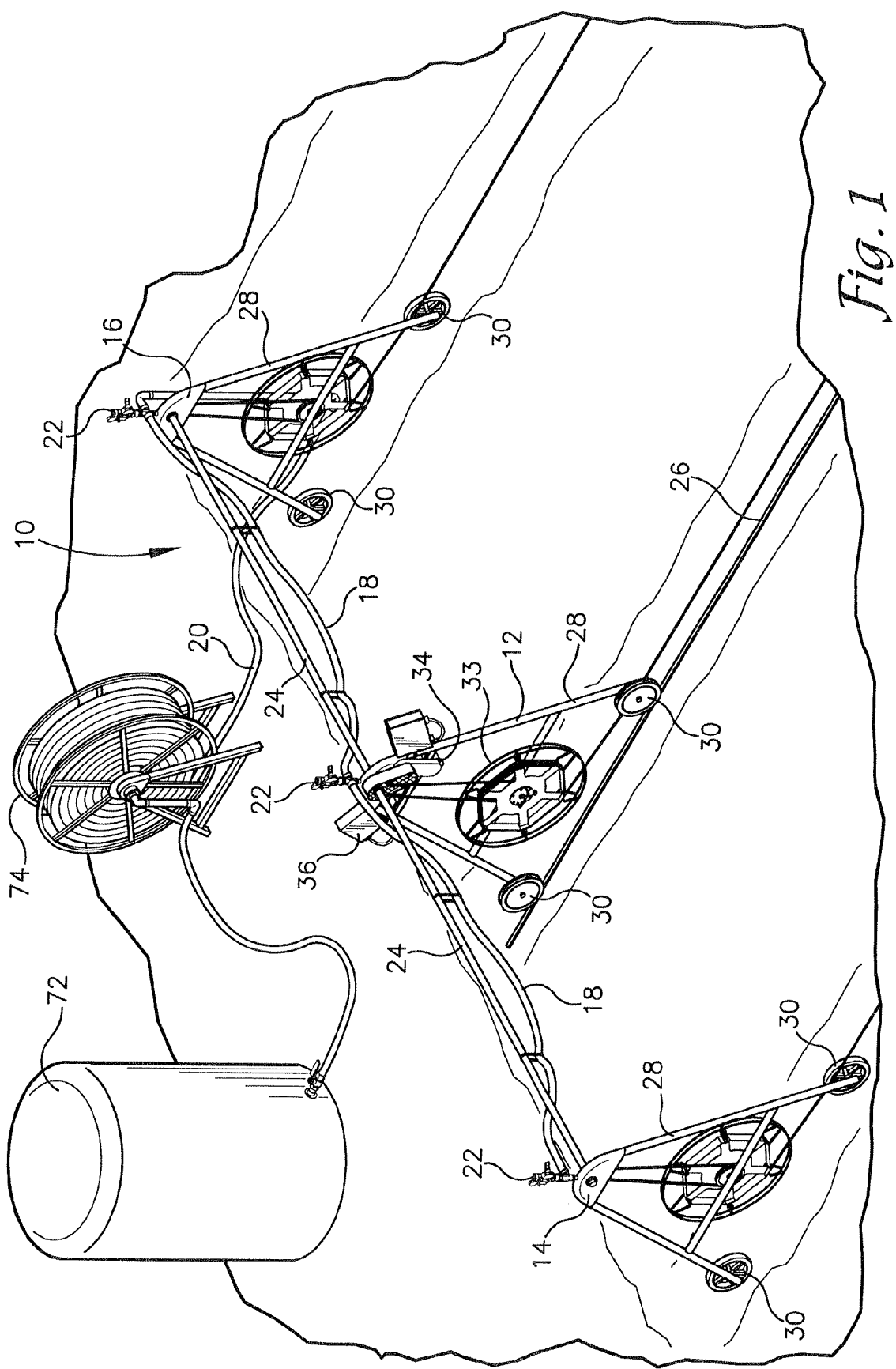
FIG. 1 is a fragmentary perspective view of an irrigation system constructed in accordance with an embodiment of the invention and shown in use in an agricultural field.

The drawing figures do not limit the present invention to the specific embodiment disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention, as illustrated in FIG. 1, include an irrigation system 10 configured for irrigating a field. The irrigation system 10 may comprise one or more towers 12,14,16, one or more hoses 18,20, and one or more fluid-emitting devices 22. The towers 12-16 may include a middle tower 12 and two end towers 14,16. Furthermore, the irrigation system 10 may comprise one or more torque tubes 24 rotatably attached to each of the towers 12-16, and at least one guide rail 26 positioned across a length of the field and configured for the middle tower 12 to travel thereon. The components of the irrigation system 10 may be assembled to be detachable and/or modular, making moving and transporting easy, and also allowing various configurations for different sized fields. For example, the number of towers and the quantity and/or length of the torque tubes 24 used may be chosen depending on a width of the area to be irrigated.

Each of the towers 12-16 may comprise a frame 28 of any shape and one or more wheels 30 rotatably attached to the frame 28. In some embodiments of the invention, the frame 28 of at least some of the towers 12-16 may be made of one or more rods shaped in a substantially triangular or A-frame configuration having lower leg portions configured for attaching the wheels 30 thereto. Additionally or alternatively, the frame 28 of at least some of the towers 12-16 may be made of one or more rods shaped in a substantially narrow rectangular shape with leg portions extending horizontally outward and then angled downward therefrom for attaching the wheels 30 thereto. In some embodiments of the invention, the wheels 30 may further comprise or be engaged by one or more breaks (not shown) at or proximate a wheel hub brushing to prevent the wheels 30 from rotating more freely than desired. The wheels 30 illustrated herein are merely examples. The term "wheel" or "wheels" as used herein may refer to conventional circular wheels, skis, skids, tank tracks and wheels, rollers on a track, or any mechanism on which the towers 12-16 may travel forward or aft relative to the ground.

Figure 2:
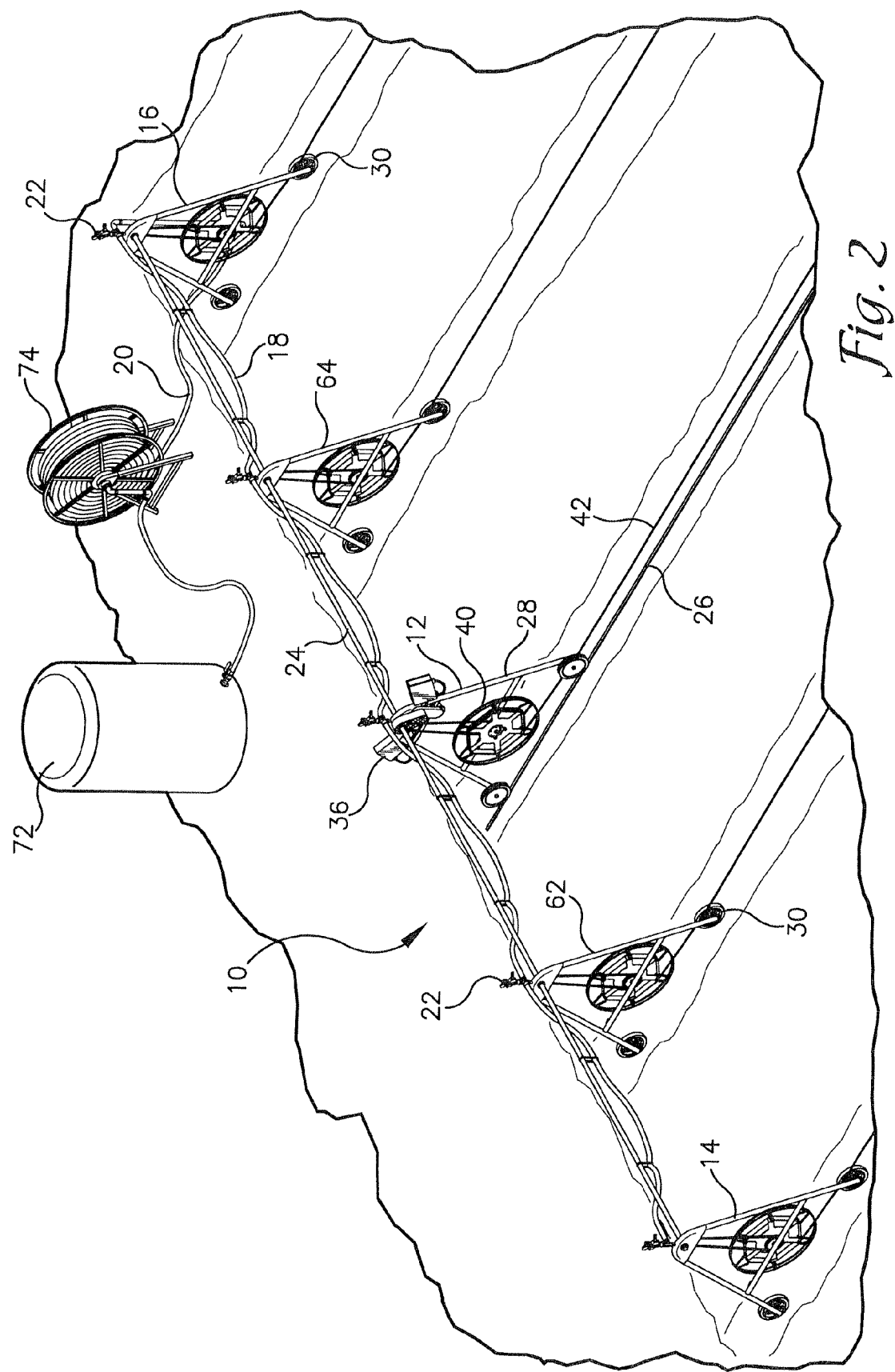
FIG. 2 is a fragmentary perspective view of an alternative embodiment of the irrigation system of FIG. 1, including additional towers.
Figure 3:
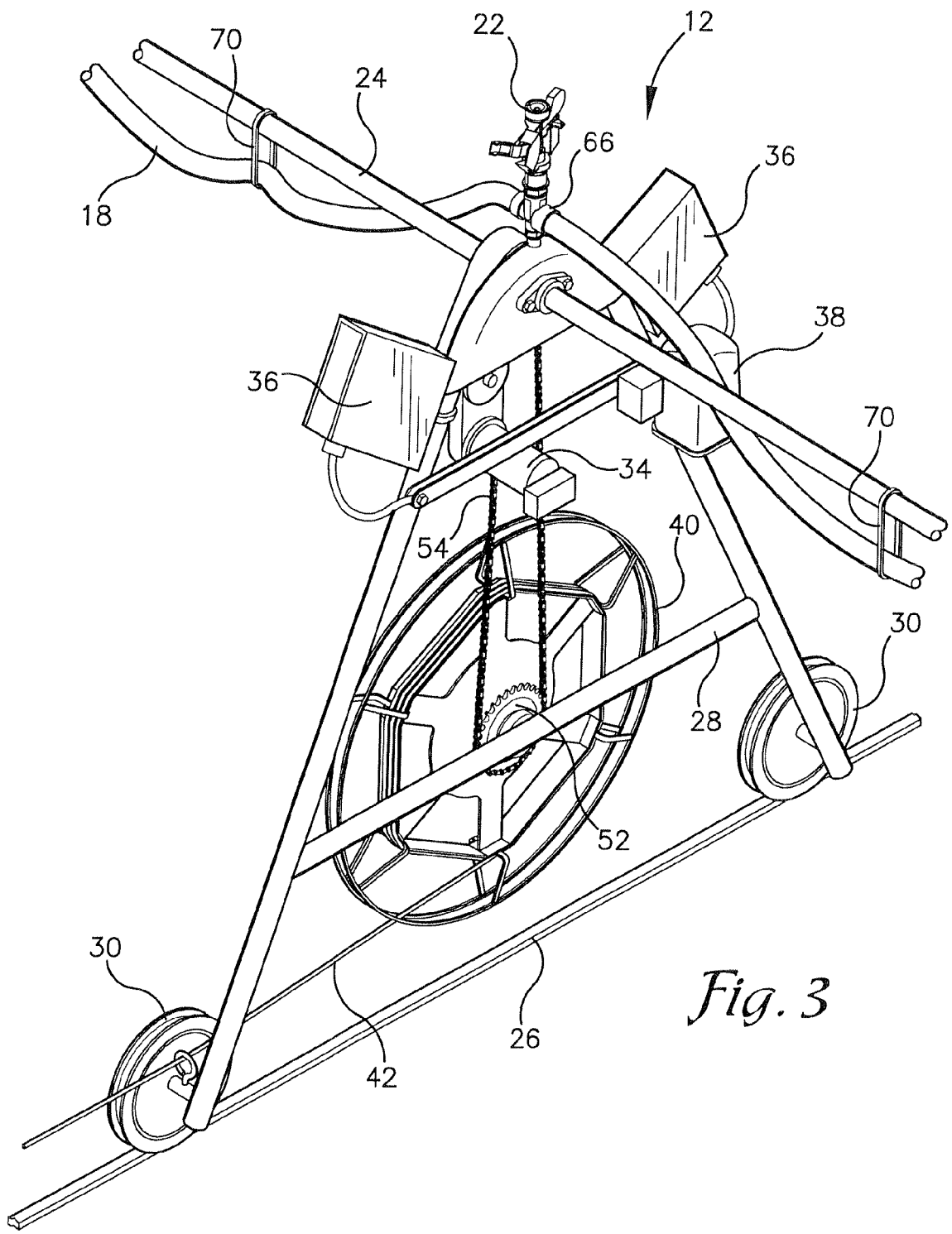
FIG. 3 is a perspective view of a middle tower of FIG. 1 showing its reel.

The middle tower 12, illustrated in FIGS. 1-3, may comprise one or more of the wheels 30, one or more of the fluid-emitting devices 22, a traveling winch 32, a gear motor 34, a power supply 36, and a selectable timer 38 to set a desired travel speed. In some embodiments of the invention, the traveling winch 32 is only located on the middle tower 12. However, in other embodiments of the invention, multiple traveling winches may be used and attached to any or all of the towers 12-16. Each traveling winch 32 may comprise at least one reel 40 located on one of the towers 12-16 and at least one line 42 attached to and configured to be wound onto the reel 40. The line 42 may be a steel cable or a rope, such as a quarter-inch polypropylene woven rope. A first end of the line 42 may be attached to the reel 40, and a second end of the line 42 may be anchored at an opposite end of the field from the towers 12-16, such that when the traveling winch 32 is rotated to wind the line 42 up thereon, the towers 12-16 move across the field toward the location at which the second end of the line 42 is anchored.

Figure 4:
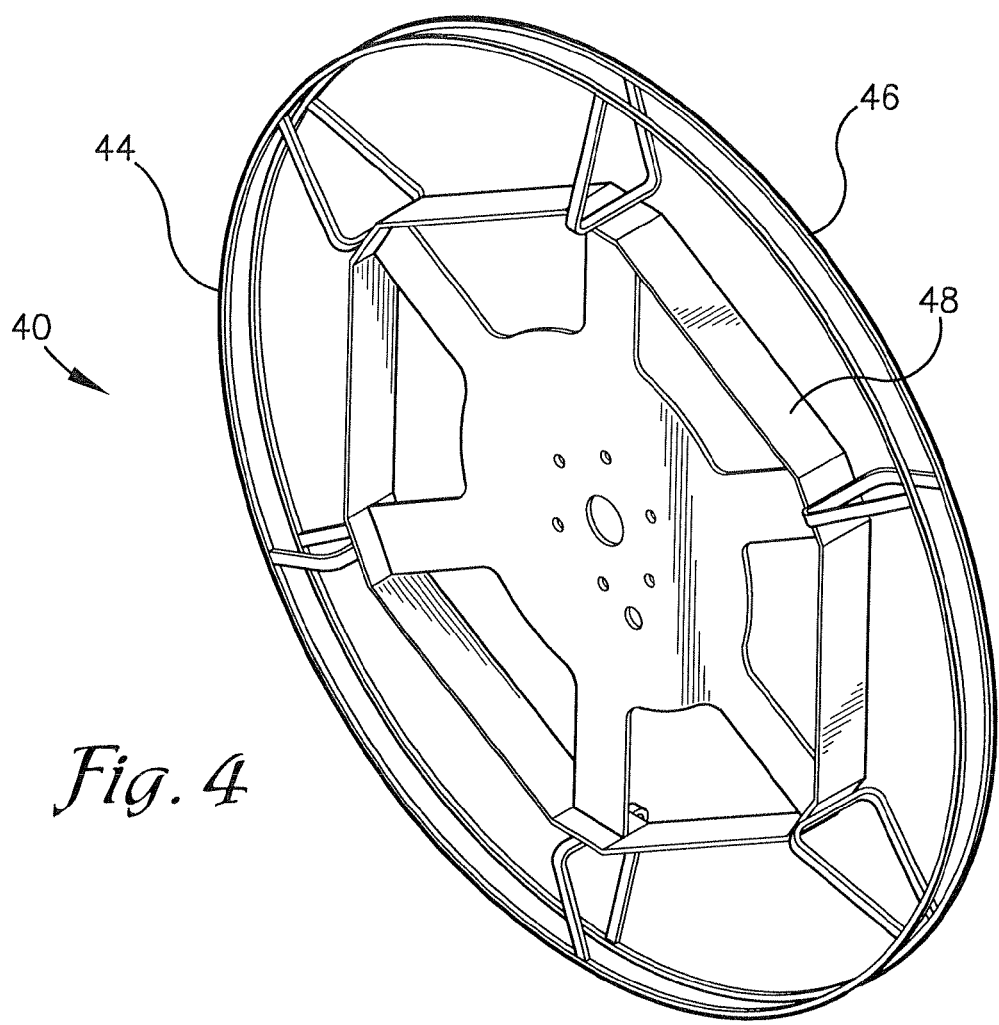
FIG. 4 is a perspective view of the reel of FIG. 3 shown removed from its tower.

As illustrated in FIG. 4, each of the reels 40 may have a shape configured for assisting in uniform spooling and unspooling of the line 42. Specifically, each reel 40 may have two rim portions 44,46 spaced apart from each other by a first distance, forming a relatively narrow entry gap at the reel's outer most edges for the line 42 to pass through. The rim portions 44,46 may be continuous rails or bars. Each of the reels 40 may also comprise a base portion 48, which may be a continuous surface onto which the line is spooled. In some embodiments of the invention, the base portion 48 may have a width greater than the first distance between the rim portions 44,46.

Figure 5:
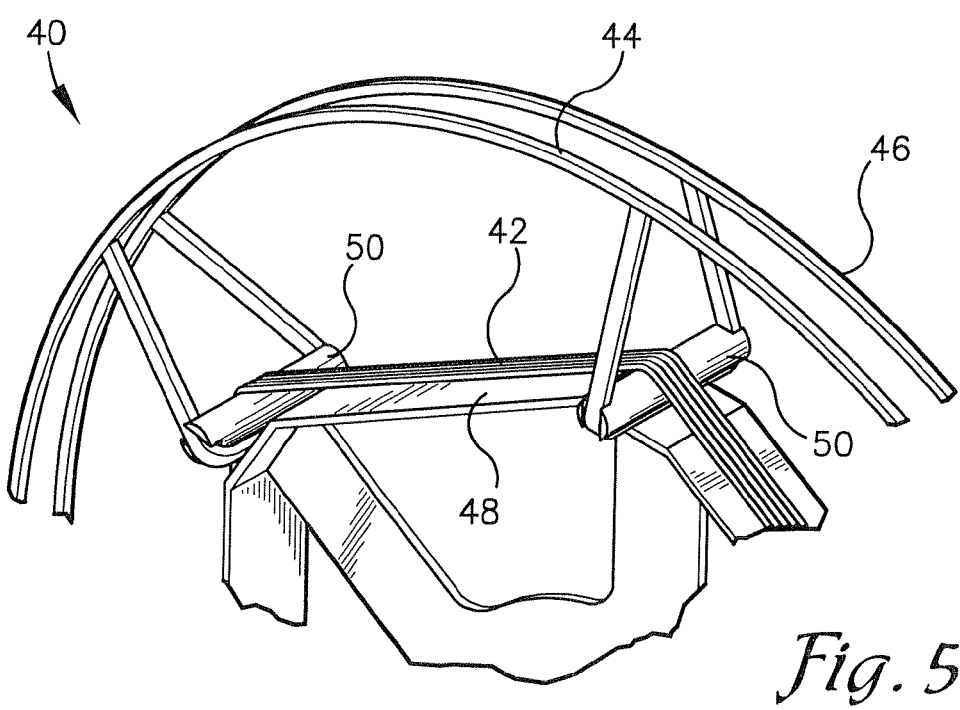
FIG. 5 is a fragmentary perspective view of the reel of FIG. 4 showing spacers installed on the reel.

In some embodiments of the invention, as illustrated in FIG. 5, one or more spacers 50 may be added to some or all of the reels 40 to change or add to the circumference of the base portion 48 onto which the line 42 is spooled. This may allow an operator to selectively vary the speed of some or all of the towers 12-16 to better synchronize movement of the towers 12-16. For example, as described later herein, one of the end towers 16 may pull one of the hoses 18,20, and therefore must overcome more inertia or force during travel. To keep the end tower 16 in alignment with the other towers 12-14, the spacers 50 may be added to the reel 40 of the end tower 16, which is attached to the hose 20. This increases the diameter of the reel 40 to offset the stretching of the line caused by the inertia/force exerted by the hose 20.

The gear motor 34, as illustrated in FIG. 3, may be attached to and configured to actuate rotation of the torque tube 24, which may subsequently rotate sprockets 52, gears, chains 54, and/or other mechanisms to drive the reels 40 at each of the towers 12-16. For example, a continuous chain 54 or belt may be configured to loop around one or more sprockets 52 fixed to the torque tube 24 and/or the reel 40 of one of the towers 12-16 in such a manner that rotation of the torque tube 24 actuates rotation of the reel 40.

The gear motor 34 may receive power from the power supply 36, such as one or more batteries. The gear motor 34 may be, for example a 90 VDC BODINE driven by a 24 volt power supply, such as two 12 VDC automotive batteries or smaller AGM deep cycle batteries. However, other power sources may be used to power the gear motor 34 without departing from the scope of the invention.

The gear motor 34 may further comprise or be communicably coupled with a selectable timer 38 configured for setting a desired travel speed for the towers 12-16 of the irrigation system 10. The selectable timer 38 may comprise a user interface (not shown) located on the middle tower 12 and/or may be remotely controlled using a wireless transmitter and receiver. The selectable timer 38 may comprise and/or be communicably coupled with a control system (not shown) for controlling speed of the towers 12-16, turning the gear motor 34 on or off, and turning water to the fluid-emitting devices 22 on or off. The control system may comprise any number of processors, controllers, integrated circuits, programmable logic devices, or other computing devices and resident or external memory for storing data and other information accessed and/or generated by the irrigation system 10. However, in various embodiments of the invention, the control system may simply comprise on/off switches and no memory elements. The control system may be physically located on one of the towers 12-16 or remotely located and configured to transmit control signals to the selectable time 38, gear motor 34, and other components of the irrigation system 10.

The control system may implement a computer program and/or code segments to perform the functions and method described herein. The computer program may comprise an ordered listing of executable instructions for implementing logical functions in the control system. The computer program can be embodied in any computer readable medium for use by or in connection with an instruction execution system, apparatus, or device, and execute the instructions. In the context of this application, a "computer readable medium" can be any physical apparatus that can contain, store, communicate, propagate, or transport the program for use by or in connection with the instruction execution system, apparatus, or device. The computer readable medium can be, for example, but not limited to, an electronic, magnetic, optical, electro magnetic, infrared, or semi conductor system, apparatus, or device. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM).

The memory may be integral with control system, stand alone memory, or a combination of both. The memory may include, for example, removable and non removable memory elements such as RAM, ROM, flash, magnetic, optical, USB memory devices, and/or other conventional memory elements. The memory may store various data associated with the operation of the irrigation system 10, such as the computer program and code segments mentioned above, or other data for instructing irrigation system 10 to perform the steps described herein. Furthermore, the memory may store, for example, field sizes, amounts of water or liquid to dispense, etc. The various data stored within the memory may also be associated within one or more databases to facilitate retrieval of the information.

In some embodiments of the invention, the reels 40 may be attached to or engaged with the torque tube 24 via a clutch 56 or clutch-like mechanism coupled with the sprockets 52, such that when the clutch 56 is engaged, the torque tube 24 may rotate the reels 40 via the gear motor 34, but when the clutch 56 is disengaged, the reels 40 may "free wheel" in reverse as the towers 12-16 of the irrigation system 10 are manually moved back to a start position in the field. For example, at least one clutch may be attached to the reels 40 and/or the torque tube 24, and in an engaged position, the clutch 56 may rotatably link the reels 40 and the torque tube 24 such that the torque tube 24 actuates simultaneous rotation of each of the reels 40. In a disengaged position, the clutch 56 may release at least one of the reels 40 and the torque tube 24 such that the reels 40 and the torque tube 24 are independently rotatable.

Figure 6:
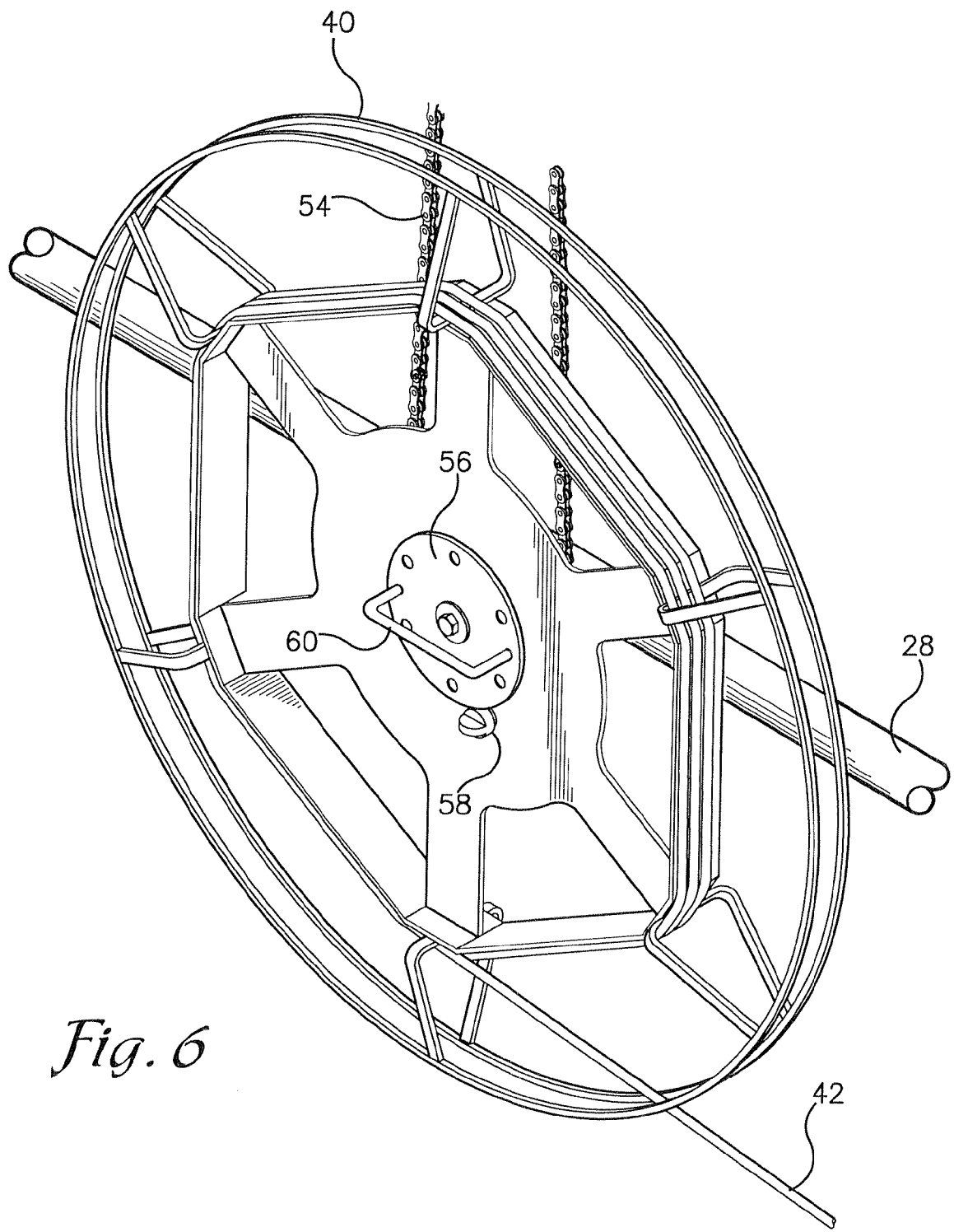
FIG. 6 is a perspective view of the reel of FIG. 3 showing its clutch.

In one embodiment of the invention, as illustrated in FIG. 6, the clutch 56 may be attached directly to the reel 40 and may link the reel 40 with at least one of the sprockets 52 and chains 54 in the engaged position, thereby linking the reel 40 with the torque tube 24 to rotate therewith. A clutch locking mechanism 58 may be turned and/or pulled outward and a handle 60 on the clutch may be pulled outward to disengage the clutch 56, allowing the reel 40 to rotate freely, independent of the torque tube 24.

As illustrated in FIGS. 1-3, one or more of the wheels 30 of the middle tower 12 may be configured to ride on or ride along the guide rail 26 across the length of the field, such that the towers 12-16 do not deviate from a desired path. For example, the wheels 30 on the middle tower 12 may be sheave shaped and/or may ride on a rail made of an EMT conduit. Furthermore, because most of the weight of the irrigation system 10 is attached to the middle tower 12 (i.e., the gear motor, power source, etc.), the guide rail 26 helps prevent the middle tower 12 from sinking too easily into soft soil in the field. The rail 26 may be staked to or otherwise fixed to ground in a straight line and may be substantially perpendicular to the torque tubes 24.

The end towers 14,16 may comprise one of the travel winches 32, one or more of the wheels 30, and one or more of the fluid-emitting devices 22 fixed thereto. As described above, the torque tube 24 may be rotatably attached to the end towers 14,16 and may have sprockets attached thereto for actuating the travel winches 32 or reels 40. In some embodiments of the invention, as illustrated in FIG. 2, one or more intermediate towers 62,64 substantially identical to the end towers 14,16 may be placed between the end towers 14,16 and the middle tower 12. The intermediate towers 62,64 may each comprise the frame 28, wheels 30, and fluid-emitting devices 22, as described above, and may have a similar or identical configuration to one or more of the end towers 14,16. Each of the towers 12-16 and 62,64 described herein may be detachable and modular, such that the number of towers and the length of the torque tube 24 may be customized for a desired field or a desired width.

As illustrated in FIGS. 1-3, the torque tube 24 may be engaged with and actuated to rotate with the gear motor 34. The torque tube 24 may comprise a single tube rotatably attached to the towers 12-16 or a plurality of tubes mechanically fixed with each other and rotatably attached to the towers 12-16. Using a plurality of torque tubes 24 may allow for the irrigation system 10 to be taken apart into a plurality of smaller, transportable pieces for removing the irrigation system 10 from the field. Furthermore, the plurality of torque tubes 24 may allow an easy way of customizing the length of the torque tubes 24 and the number of towers 12-16 used, depending on a width of a field or area to be irrigated. In an example embodiment where two torque tubes 24 are used, a jackshaft (not shown) may connect the two adjacent torque tubes 24 at the middle tower 12. The jackshaft may transfer power from the gear motor 34 equally and synchronously to all of the towers 12-16.

Figure 7:
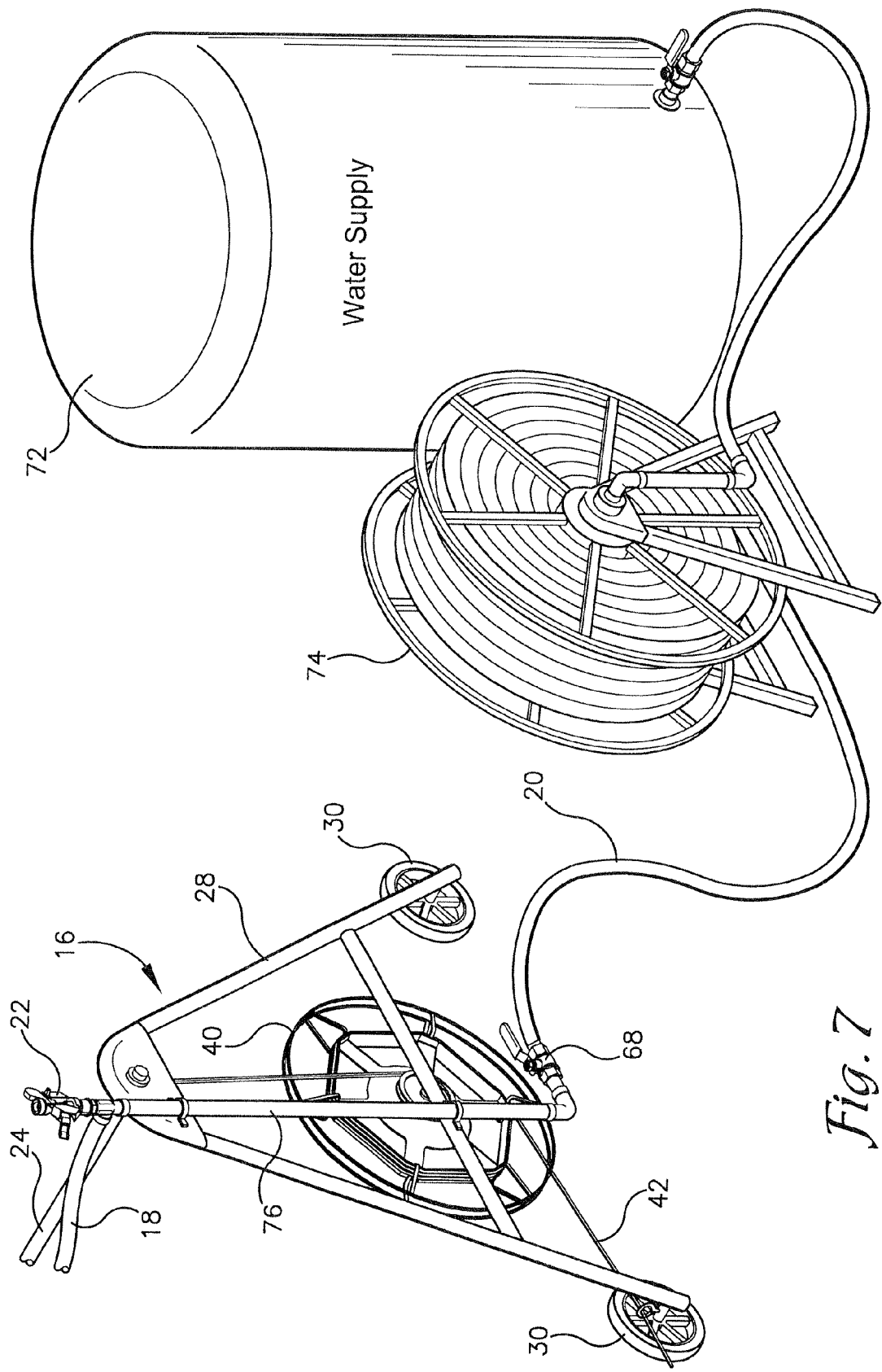
FIG. 7 is a perspective view of an end tower of FIG. 1 connected to a water supply via a supply reel.

The fluid-emitting devices 22 may be or may comprise one or more sprinkler heads, as illustrated in FIGS. 1-3 and 7, or alternatively may comprise drip holes formed in the hoses 18,20, spray nozzles, or other fluid emitters. Each of the fluid-emitting devices 22 may be fixed to one of the towers 12-16 or attached at any location to the irrigation system 10. In one embodiment of the invention, the fluid-emitting devices 22 may comprise a linking pipe 66 and/or hoist to connect one or more of the hoses 18,20 thereto, so that water may flow from the hoses 18,20 to the fluid-emitting devices 22, as illustrated in FIG. 3. At least one of the fluid-emitting devices 22 may comprise and/or be fluidly connected to a supply/shut-off valve 68, as illustrated in FIG. 7, for turning water on and off to the fluid-emitting devices 22 and controlling how much water is provided to the fluid-emitting devices 22. The supply/shut-off valve 68 may be actuated manually, electronically, remotely, and/or automatically by the control system, which may be physically and/or communicably coupled with the supply/shut-off valve 68. The control system may simultaneously actuate the gear motor 34 and the supply/shut-off valve 68 on and/or off.

In some embodiments of the invention, the control system may comprise and/or be communicably coupled with a stop switch (not shown) which may be triggered when the towers 12-16 approach or reach a particular location in the field. The stop switch may be configured to shut off the gear motor 34 and/or close the supply/shut-off valve 68. The stop switch may be actuated based on a sensed geographic location, a sensed distance traveled, and/or a physical actuation triggered via the anchored end of the line 42, a stop device (not shown) on the guide rail 26, or some other device fixed proximate to the first end or anchored end of the line 42.

The hoses 18,20 may comprise one or more linking hoses 18 and/or one or more supply hoses 20. The linking hoses 18 may comprise a single hose fluidly attaching multiple fluid-emitting devices 22. Alternatively, a plurality of linking hoses 18 may be used, each extending between two adjacent fluid-emitting devices 22. The linking hoses 18 may be attached to and/or fluidly coupled with the hook-up/shut-off valve 68 and supported loosely to the torque tube 24 such that the hoses do not rotate with the torque tube 24. For example, the linking hoses 18 may be attached to the torque tube 24 with plastic tie straps 70, as illustrated in FIG. 3.

The supply hose 20 may fluidly attach a water supply 72 to the linking hoses 18. For example, one end of the supply hose 20 may be attached at one of the end towers 14,16 to one of the linking hoses 18, fluid-emitting devices 22, and/or supply/shut-off valve 68 and an opposite end of the supply hose 20 may be attached to the water supply 72. The supply hose 20 may be at least as long as the length of the field. As the towers 12-16 are moved across the field, the supply hose 20 may be pulled in a direction away from the water supply 72. For example, the supply hose 20 may be wrapped around a supply reel 74 fixed relative to the water supply 72. As the towers 12-16 are actuated to move across the field, the supply hose 20 is subsequently unwrapped from the supply reel 74. In some embodiments of the invention, a drop pipe 76 may be located at one or both of the end towers 14,16 to allow for a drain and flushing of water in the hoses 18,20 and/or to supply water from the supply hose 20 to the linking hoses 18 and fluid-emitting devices 22.

In some embodiments of the invention, a plurality of water supplies and/or water supply hook-ups, such as hydrants, may be located at various locations relative to the field, such that the hoses 18,20 may be attached to the nearest one of the water supplies. For example, if a field or area of a field to be irrigated is 400 ft long, and the length of the hose is only 120 ft, the hose may need to be unattached from a first water source and reattached to a second water source midway across the field during irrigation thereof. Specifically, the irrigation system 10 may be limited on the length of hose it can pull, due to the weight of the hoses 18,20, the strength of the motor 34, and other physical limitations.

Figure 8:
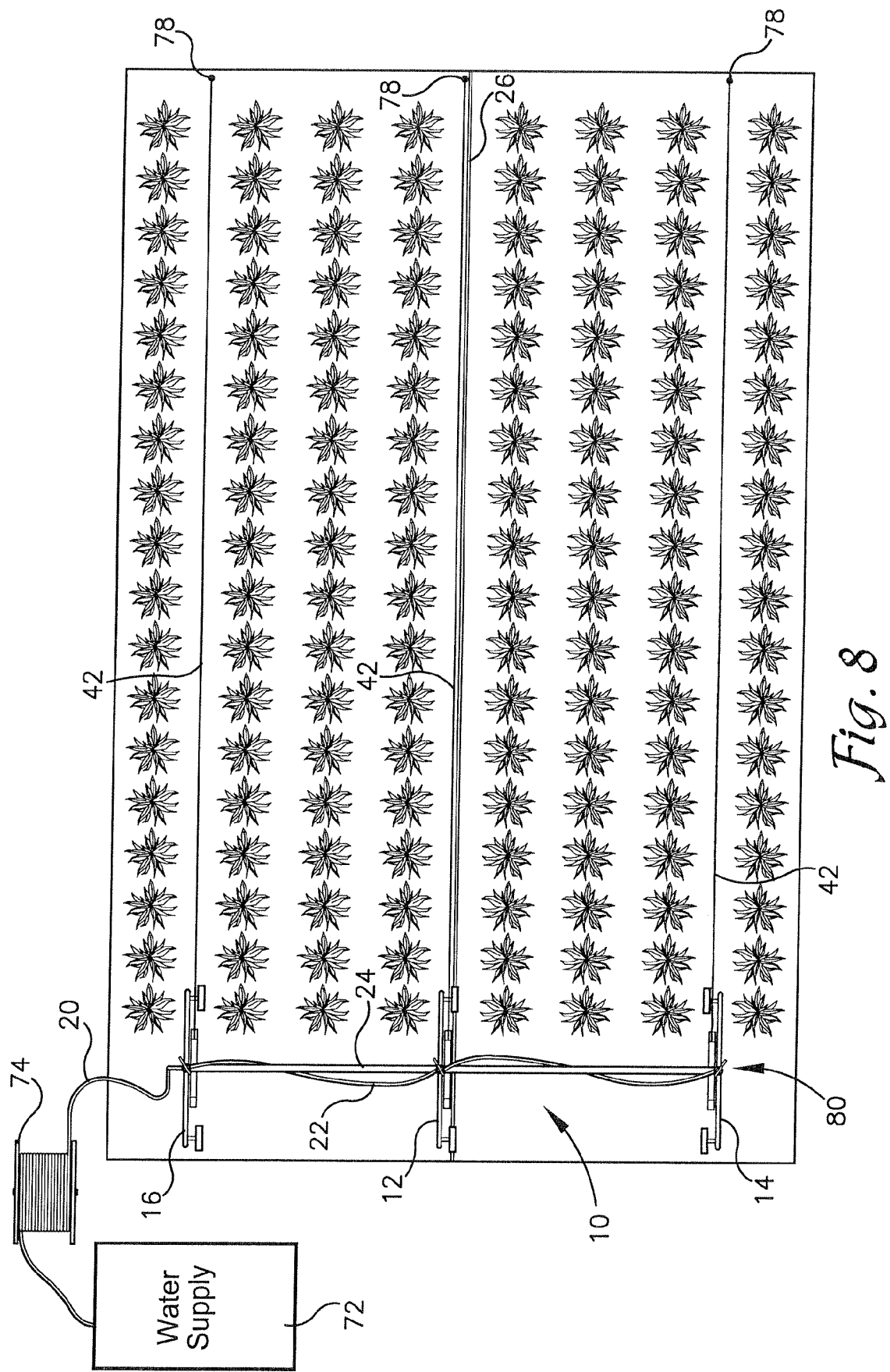
FIG. 8 is a plan view of the irrigation system of FIG. 1 in a field.

In use, the lines 42 may each be anchored at an opposite end of the field or area to be irrigated relative to a starting location of the towers 12-16 of the irrigation system 10. For example, as illustrated in FIG. 8, an end of each of the lines 42 may be anchored at a first location 78, and the towers may be initially located at a second location 80. Then the gear motor 34 may be turned on, actuating the towers 12-16 to travel across the field, and the hook-up/shut-off valve 68 may be opened to allow water or any desired liquid to be sprayed from the fluid-emitting devices 22. A user may set a speed of travel via the selectable timer 38 and/or control system.

Figure 9:
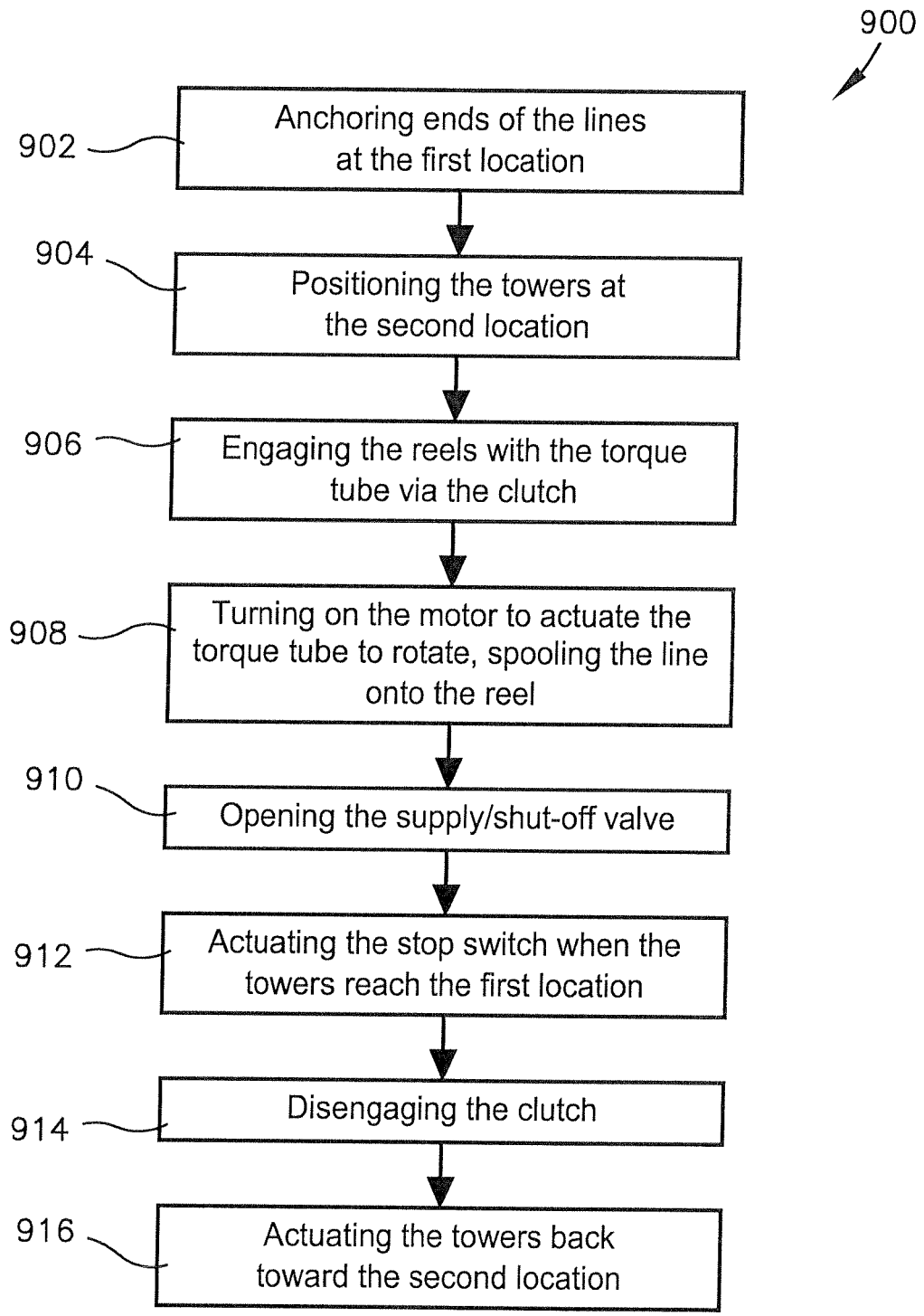
FIG. 9 is a flow chart of a method for irrigating a field in accordance with an embodiment of the present invention.

A flow chart of a method for irrigating a field with the irrigation system 10 is illustrated in FIG. 9. The flow chart of FIG. 9 depicts the steps of an exemplary method 900 of the invention in more detail. In some alternative implementations, the functions noted in the various blocks may occur out of the order depicted in FIG. 9. For example, two blocks shown in succession in FIG. 9 may in fact be executed substantially concurrently, or the blocks may sometimes be executed in the reverse order depending upon the functionality involved.

The method 900, as illustrated in FIG. 9, may comprise the steps of anchoring the first ends of the lines 42 at the first location 78, as depicted in step 902 and positioning the towers 12-16 at the second location 80, as depicted in step 904. The reels 40 may then be engaged with the torque tube 24 by engaging the clutch 56, as depicted in step 906.

When the clutch 56 is engaged, power to the gear motor 34 may then be turned on, as depicted in step 908, to actuate the torque tube 24 to rotate, thereby spooling the lines 42 onto the reels 40. Specifically, the gear motor 34 may be configured to engage and actuate sprockets on the torque tube 24, actuating the torque tube 24 to rotate. The same sprocket and/or additional sprockets on the torque tube 24 may engage one or more of the continuous chains 54 on each of the towers 12-16, rotating the chains 54 to actuate rotation of the sprockets 52 fixed to the reels 40 by the engaged clutch 56, thus spooling the lines 42 onto the reels 40. As the lines 42 are taken up onto the reels 40, the towers 12-16 are subsequently pulled from the second location 80 toward the first location 78 at the opposite end of the field or area to be irrigated.

The supply/shut-off valve 68 may be turned on, as depicted in step 910, automatically when the gear motor 34 is turned on or may be manually and/or independently controlled. Opening the supply/shut-off valve 68 allows water or any other liquid to flow from the water supply 72 through the hoses 18,20 to the fluid-emitting devices 22, thus irrigating the field as the towers 12-16 are actuated across the field.

Once the towers reach the first location 80, the stop switch may be actuated to stop, as depicted in step 912. The stop switch may be triggered at a pre-selected location along the lines 42 or guide rail 26 to turn off the gear motor 34 and/or close the hook-up/shut-off valve 68. Then, the clutch 56 may be disengaged, as depicted in step 914, either manually or automatically as a result of the stop switch being triggered.

Once the field has been irrigated and/or the towers 12-16 have reached the second location 80 and the clutch 56 is disengaged, the towers 12-16 may be actuated back to the second location 80, as depicted in step 916. For example, disengaging the clutch may allow field workers to push the towers 12-16 back to the second location 80 or starting location while the reels 40 free wheel, letting out the lines 42 as the towers 12-16 are moved away from the first location 78 of the field and/or the anchored end of the lines 42.

In an alternative method of the invention, the direction of the reels 40 may be reversed once the towers reach the first location 78, and the first end of the lines 42 may be pulled outward from the reels 40 and anchored at or proximate the starting location or the second location 80. The gear motor 34 may be configured to actuate rotation of the reels 40 in a clockwise and/or a counterclockwise direction. Then the towers 12-16 may be pulled back across the field to the second location 80 by rotating the reels 40 to once again take up the lines 42 thereon. Furthermore, prior to pulling the lines 42 from the towers 12-16 at the first location 78 back to the starting or second location 80 to be anchored, the reels 40 may be disengaged via the clutch 56 for easy release of the lines 42. Once the end of the lines 42 are anchored at the second location 80, the reels 40 may be re-engaged via the clutch 56 and then the gear motor 34 may be turned on to pull the towers back across the field from the first location 78 to the second location 80.

Although the invention has been described with reference to the embodiments illustrated in the attached drawing figures, it is noted that equivalents may be employed and substitutions made herein without departing from the scope of the invention as recited in the claims. For example, while the gear motor 34 and power source 36 are described herein as being located on the middle tower 12, these elements may additionally or alternatively be located on any one or more of the other towers 14-16, which may also ride along one or more guide rails, such as the guide rail 26.

Having thus described various embodiments of the invention, what is claimed as new and desired to be protected by Letters Patent includes the following:

1. An irrigation system configured to irrigate a field, the irrigation system comprising:
    a plurality of spaced-apart towers, at least two of the towers comprising:
        a frame,
        one or more wheels rotatably attached to the frame,
        a reel rotatably attached to the frame, and
        a line attached to the reel and configured to be spooled onto the reel;
    one or more torque tubes rotatably attached to the frames of the towers, spanning between and physically connecting the towers with each other, and configured to simultaneously actuate rotation of each of the reels;
    one or more fluid-emitting devices located at one or more of the towers;
    one or more hoses attached to the fluid-emitting devices and fluidly connecting the fluid-emitting devices with a source of fluid; and
    a motor attached to and located at one of the plurality of towers and operable to actuate the torque tubes to rotate, thereby actuating the reels to rotate, thus spooling the line onto the reels and actuating the towers to travel from a second location to a first location.

2. The irrigation system of claim 1, further comprising a guide rail anchored to and extending across the field from the second location to the first location, wherein the wheels of the tower to which the motor is attached contact and are configured to travel along the guide rail.

3. The irrigation system of claim 1, wherein one or more of the towers further comprises one or more sprockets fixed to at least one of the torque tubes and the reel, and a continuous chain or belt looped around the sprockets such that rotation of the torque tubes actuates rotation of the reel.

4. The irrigation system of claim 1, further comprising a clutch attached to the reels and the torque tubes, wherein the clutch is operable to be placed in an engaged position in which the reels and the torque tubes are rotatably attached and is operable to be placed in a disengaged position in which the reels are not rotatably attached to the torque tubes.

5. The irrigation system of claim 1, wherein the reels each include two rim portions spaced apart from each other by a first distance and a base portion onto which the line is spooled, wherein the base portion is located between and inward of the two rim portions, wherein a width of the base portion is larger than the first distance.

6. The irrigation system of claim 1, further comprising a detachable spacer positioned between the reel and the line when the line is spooled onto the reel, wherein a speed of the towers is dependent on a thickness of the spacer.

7. The irrigation system of claim 1, wherein the plurality of towers and the torque tubes are modular, such that the irrigation system is reconfigurable to attach thereto different quantities of the towers and the torque tubes depending on a width of the field.

8. The irrigation system of claim 1, further comprising:
    a supply hose connecting a supply of fluid with the fluid-emitting devices at one of the end towers; and
    a supply/shut-off valve fluidly connected to the supply hose and configured for opening and closing to control a flow of fluid from the supply hose to the fluid-emitting devices.

9. The irrigation system of claim 1, wherein the torque tubes are rotatably linked with each other at each tower via a jackshaft.

10. The irrigation system of claim 1, wherein the gear motor is configured to selectively actuate rotation of the reels in a clockwise and a counterclockwise direction.

11. The irrigation system of claim 8, further comprising a stop switch configured to stop at least one of the flow of fluid to the fluid-emitting devices via the supply/shut-off valve and travel of the towers based on a location of the towers.

12. An irrigation system configured to irrigate a field, the irrigation system comprising:
    two end towers and a middle tower located between the end towers, each comprising:
        a frame,
        one or more wheels rotatably attached to the frame,
        a reel rotatably attached to the frame, and
        a line having a first end attached to the reel and a second end operable to be anchored to a first location in the field, wherein the line is configured to be spooled onto the reel;
    at least one torque tube rotatably attached to the frames of the towers;
    at least one clutch attached to the reels and the torque tube, wherein, in an engaged position, the clutch rotatably links the reels and the torque tube such that the torque tube actuates simultaneous rotation of each of the reels and in a disengaged position, the clutch releases at least one of the reels and the torque tube such that the reels and the torque tube are independently rotatable;
    a guide rail anchored to and extending across the field, wherein the wheels of the middle tower are located on and configured to travel along the guide rail;
    one or more fluid-emitting devices located at one or more of the towers;
    one or more linking hoses attached to the fluid-emitting devices and fluidly connecting the fluid-emitting devices with each other and with a source of fluid; and
    a gear motor powered by a battery, attached to the middle tower, and operable to actuate the torque tube to rotate, thereby actuating the reels to rotate, thus spooling the line onto the reels and actuating the towers to travel from a second location to a first location when the first ends of each of the lines are anchored at the first location.

13. The irrigation system of claim 12, wherein one or more of the towers further comprises one or more sprockets fixed to at least one of the torque tube and the reel, and a continuous chain or belt looped around the sprockets such that rotation of the torque tube actuates rotation of the reel.

14. The irrigation system of claim 12, wherein the reels each include two rim portions spaced apart from each other by a first distance and a base portion onto which the line is spooled, wherein the base portion is located between and inward of the two rim portions, wherein a width of the base portion is larger than the first distance.

15. The irrigation system of claim 12, further comprising a detachable spacer positioned between the reel and the line when the line is spooled onto the reel, wherein a speed of the towers is dependent on a thickness of the spacer.

16. The irrigation system of claim 12, wherein the plurality of towers and the torque tube are modular, such that the irrigation system is reconfigurable to attach thereto different quantities of the towers and the at least one torque tube depending on a width of the field.

17. The irrigation system of claim 12, further comprising:
a supply hose connecting a supply of fluid with the fluid-emitting devices at one of the end towers; and
a supply/shut-off valve fluidly connected to the supply hose and configured for opening and closing to control a flow of fluid from the supply hose to the fluid-emitting devices.

18. The irrigation system of claim 12, wherein the torque tube is a plurality of torque tubes rotatably linked with each other at each tower via a jackshaft, wherein the gear motor is configured to selectively actuate rotation of the reels in a clockwise and a counterclockwise direction.

19. The irrigation system of claim 17, further comprising a stop switch configured to stop at least one of the flow of fluid to the fluid-emitting devices via the supply/shut-off valve and travel of the towers based on a location of the towers.

20. A method of irrigating a field with an irrigation system having a plurality of towers spaced apart from each other, at least one torque tube rotatably attached to the towers, at least one reel rotatably attached to at least one of the towers, a line attached to the reel and configured to be spooled onto the reel, at least one fluid-emitting device located on one or more of the towers, and at least one hose connecting a fluid supply with the fluid-emitting devices, the method comprising:
anchoring an end of at least one of the lines at a first location in the field;
positioning the plurality of towers at a second location in the field;
engaging a clutch such that the reel rotates when the torque tube rotates;
actuating the torque tube to rotate using a gear motor, thereby spooling the line onto the reel, actuating the towers toward the first location; and
opening a supply/shut-off valve of the irrigation system, allowing fluid to flow from the fluid supply to the fluid-emitting device.

21. The method of claim 20, further comprising:
actuating a stop switch when the towers have reached a pre-determined location relative to the first location, wherein the stop switch is configured to close the supply/shut-off valve and stop rotation of the reel;
disengaging the clutch such that the reels rotate independently of the torque tube; and
actuating the towers back toward the second location.

22. An irrigation system configured to irrigate a field, the irrigation system comprising:
a plurality of spaced-apart towers, at least one of the towers comprising:
a frame,
one or more wheels rotatably attached to the frame,
a reel rotatably attached to the frame, and
a line attached to the reel and configured to be spooled onto the reel;
one or more torque tubes rotatably attached to the frames of the towers and configured to simultaneously actuate rotation of each of the reels;
one or more fluid-emitting devices located at one or more of the towers;
one or more hoses attached to the fluid-emitting devices and fluidly connecting the fluid-emitting devices with a source of fluid;
a motor attached to and located at one of the plurality of towers and operable to actuate the torque tubes to rotate, thereby actuating the reels to rotate, thus spooling the line onto the reels and actuating the towers to travel from a second location to a first location; and
a clutch attached to the reels and the torque tubes, wherein the clutch is operable to be placed in an engaged position in which the reels and the torque tubes are rotatably attached and is operable to be placed in a disengaged position in which the reels are not rotatably attached to the torque tubes.

* * * * *